United States Patent
Anderson et al.

(10) Patent No.: US 6,510,434 B1
(45) Date of Patent: Jan. 21, 2003

(54) SYSTEM AND METHOD FOR RETRIEVING INFORMATION FROM A DATABASE USING AN INDEX OF XML TAGS AND METAFILES

(75) Inventors: Dewey C. Anderson; David J. Anderson, both of Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/474,644

(22) Filed: Dec. 29, 1999

(51) Int. Cl.[7] .......................... G06F 17/30; G06F 15/00; G06F 15/16

(52) U.S. Cl. ...................... 707/100; 707/101; 707/102; 707/103; 707/104; 707/3; 707/10; 707/513; 709/201

(58) Field of Search ................... 707/100, 101, 707/102, 103, 104, 3, 10, 513; 709/201

(56) References Cited

U.S. PATENT DOCUMENTS

| | | |
|---|---|---|
| 4,128,882 A | 12/1978 | Dennis |
| 4,130,885 A | 12/1978 | Dennis |
| 4,872,122 A | 10/1989 | Altschuler et al. |
| 4,931,941 A | 6/1990 | Krishnan |
| 5,005,143 A | 4/1991 | Altschuler et al. |
| 5,170,480 A | 12/1992 | Mohan et al. |
| 5,175,814 A | 12/1992 | Anick et al. |
| 5,222,238 A | 6/1993 | Zobre et al. |
| 5,337,347 A | 8/1994 | Halstead-Nussloch et al. |
| 5,379,391 A | 1/1995 | Belsan et al. ............... 711/114 |
| 5,404,508 A | 4/1995 | Konrad et al. |
| 5,455,946 A | 10/1995 | Mohan et al. |
| 5,465,368 A | 11/1995 | Davidson et al. |
| 5,526,356 A | 6/1996 | Kim et al. |
| 5,561,795 A | 10/1996 | Sarkar |
| 5,615,364 A | 3/1997 | Marks |
| 5,630,125 A | 5/1997 | Zellweger |
| 5,634,051 A | 5/1997 | Thompson |
| 5,636,350 A | 6/1997 | Eick et al. ................... 345/440 |

(List continued on next page.)

FOREIGN PATENT DOCUMENTS

| | | | |
|---|---|---|---|
| EP | 0747845 | 12/1996 | |
| WO | WO 88/02147 | 3/1988 | |
| WO | WO 97/10554 | 3/1997 | |
| WO | WO 97/19415 | 5/1997 | |
| WO | WO01/17286 A1 * | 8/2001 | ............ H04Q/7/20 |

OTHER PUBLICATIONS

"solaris mmap.2". Can be found at the following uniform resources location (URL) address on the Internet: waterloo.cal/man/solaris/mmap.2.html Printed pp. 1–4.

"nif–T–nav: A Hierarchical Navigator for WWW Pages," by Kirsten L. Jones, Computer Networks and ISDN Systems 28 (1996) 1345–1353.

Primary Examiner—Frantz Coby
(74) Attorney, Agent, or Firm—Kilpatrick Stockton LLP

(57) ABSTRACT

Retrieving information from a database using an index of XML (eXtensible Markup Language) tags and metafiles. The index includes XML tags that correspond to domains and categories. The domains and categories are selected to facilitate searching of the database. An XML tag can have a corresponding metafile that includes XML tags for related domains and categories. The metafile can also establish a hierarchy for the tags within the metafile. Each record of the database includes an index component which lists the domain tags and category tags that are associated with the record. When a search request is received, the request is parsed to identify the terms in the request. The terms are predetermined and generally correspond to the domains and categories of the index. The terms are mapped to tags. Once the appropriate tags are identified, then the metafiles that correspond to those tags are identified. The metafiles can be used to identify additional tags that are relevant to the search. The identified tags are combined to create a unique key. The key is used to search the database to locate records that include the tags in their index component.

28 Claims, 12 Drawing Sheets

U.S. PATENT DOCUMENTS

| | | |
|---|---|---|
| 5,649,139 A | 7/1997 | Weinreb et al. |
| 5,657,465 A | 8/1997 | Davidson et al. |
| 5,689,719 A | 11/1997 | Miura et al. |
| 5,692,173 A | 11/1997 | Chew |
| 5,708,825 A | 1/1998 | Sotomayor ................. 395/762 |
| 5,721,819 A | 2/1998 | Galles et al. |
| 5,727,156 A | 3/1998 | Herr-Hoyman et al. ..................... 395/200.49 |
| 5,734,649 A | 3/1998 | Carvey et al. |
| 5,737,334 A | 4/1998 | Prince et al. |
| 5,737,738 A | 4/1998 | Sharman |
| 5,740,433 A | 4/1998 | Carr et al. |
| 5,778,367 A | 7/1998 | Wesinger, Jr. et al. ........ 707/10 |
| 5,794,233 A | 8/1998 | Rubinstein ..................... 707/4 |
| 5,802,518 A | 9/1998 | Karaev et al. ................. 707/9 |
| 5,805,593 A | 9/1998 | Busche |
| 5,813,006 A | 9/1998 | Polnerow et al. ............. 707/10 |
| 5,862,138 A | 1/1999 | Liu |
| 5,864,871 A | 1/1999 | Kitain et al. ................ 707/104 |
| 5,983,218 A * | 11/1999 | Syeda-Mahmood ............ 707/3 |
| 6,055,538 A | 4/2000 | Kessenich et al. .......... 707/101 |
| 6,094,649 A * | 7/2000 | Bowen et al. ................. 707/3 |
| 6,209,124 B1 * | 3/2001 | Vermeire et al. .............. 717/1 |
| 6,263,332 B1 * | 7/2001 | Masr et al. ..................... 707/5 |
| 6,339,776 B2 * | 1/2002 | Dayani-Fard et al. ....... 707/102 |

* cited by examiner

SYSTEM AND METHOD FOR RETRIEVING INFORMATION FROM A DATABASE USING AN INDEX OF XML TAGS AND METAFILES

RELATED APPLICATIONS

This U.S. patent application relates to U.S. Pat. No. 5,878,423, entitled "A System and Methods for Dynamically Processing an Index to Dynamically Create a Set of Questions", U.S. Pat. No. 5,937,168, entitled "A System and Methods for Routing Information Within an Adaptive Routing Architecture of an Information Retrieval System", U.S. Pat. No. 6,005,860 entitled "A Method for Routing Information Between an Origination Module and a Destination Module Using a Routing Architecture", and U.S. patent application Ser. No. 08/949,881, entitled "A System and Method for Processing a Memory Map to Provide Listing Information Representing Data within a Database" filed Oct. 14, 1997 now U.S. Pat. No. 5,952,946. The present application and the related U.S. patents and pending U.S. patent application are assigned to BellSouth Intellectual Property Corporation.

TECHNICAL FIELD

This invention relates in general to locating information in a database, and more particularly to using an index that includes tags and metafiles to locate the desired information.

BACKGROUND OF THE INVENTION

There is an ever-increasing amount of recorded and searchable information. To efficiently search for specific information, information retrieval systems have been developed. Information retrieval systems ("IR systems") are systems for finding, organizing, and delivering information. A computerized IR system typically responds to data inquiries or search requests by routing messages and files between a user interface and a search engine for a database in order to perform a search of the database for desired information.

A goal of an IR system is to locate the requested information as quickly as possible. However, one problem with IR systems is that the search results returned do not always include the information requested. If the search results do not include the information requested, then the user must repeat the search using a different search request. One reason that the search results returned may not include the information requested is that the IR system incorrectly interpreted the search request. This may happen if the search request uses an ambiguous term. The search request may be ambiguous because a term used in the search request has multiple meanings. For example, if the search request includes the term "Ford", it may be unclear whether the request is directed to the Ford Company, the Ford Theater, or the FORD brand of vehicles. Thus, there is a need in the art for a method that eliminates any ambiguity in the search request.

Another problem is that too much information can be returned to the user. If the user enters a broad search request, then the user may be overwhelmed by the amount of information returned and may not be able to locate the desired information in the search results. For example, if the search request specifies the FORD brand of vehicles, the search results returned may include information on every Ford vehicle, including automobiles, trucks, vans, and vehicles that are no longer in production, as well as information on the repair and sale of FORD brand vehicles. If the user only wanted information about a particular model of automobile, the user must sort through the search results to locate the desired information. Thus, there is a need for a method that focuses a search so that only the most relevant information is returned or that queries a user for additional search criteria so that the information desired by the user is provided.

Due to the number of databases, it is possible that information stored in one database is repeated in another database. The same information may be stored in multiple databases to accommodate the requirements of different types of IR systems. To eliminate the need to maintain multiple databases that contain the same information, a universal search vocabulary is needed. If a universal search vocabulary is used to create a database, then any IR system that uses the universal vocabulary can locate information in the database.

Even though there are a multitude of databases, the requested information may not be located in a single database. If a user requests information that is stored in separate, unrelated databases, then the user may need to conduct multiple searches using different IR systems to locate all of the desired information. To eliminate the need to conduct multiple searches, a universal search vocabulary is needed to search any number of separate, unrelated databases to locate the desired information.

Accordingly, there is a need in the art for an improved method of searching that uses a universal search vocabulary. The method should eliminate ambiguity in the search request, focus the search on the most relevant information, perform the search in the most efficient manner and support searching multiple databases. The method should also support a hierarchy that can be used to query a user for additional search criteria in an efficient and intelligent manner.

SUMMARY OF THE INVENTION

The present invention meets the needs described above by providing a method for locating information stored in a database using an index that includes tags and metafiles to locate the desired information. In general, an index is essentially a guide that is used to locate information stored in a database. Preferably, the index includes tags that correspond to categories and domains. A category includes a group of terms. A term may appear in more than one category, but a term may only appear once in any given category. For example, the term "American" may appear in the Cuisine category and in the Brand category, but may only appear once in the Cuisine category.

A domain is generally described as a grouping of categories. For example, the Restaurant domain may include the Cuisine category and, therefore, the terms "Mexican" and "American." The domains, categories, and terms are used to locate information within the database.

The index is created so that a tag is associated with each domain (a domain tag) and with each term associated with a category (a category tag). A tag is associated with data or text and conveys information about the data or text. In one aspect of the invention, the tags are XML (eXtensible Markup Language) tags. For example, an XML tag is created for the Restaurant domain and another XML tag is created for the American Cuisine category. In addition, many of the tags have an associated metafile. A metafile provides additional information about the tag. A metafile typically includes a list of related tags, such as domain tags and category tags. A metafile also implements a hierarchy between the tags in the metafile.

Each record of an exemplary database includes an Alpha Component and an XML Index Component. The Alpha Component contains identifying information for the record and the XML Index Component includes XML tags that are associated with the record. When a search request is received, a set of tags that correspond to the request are identified. The set of tags is compiled as a key and is used to search the database to locate records that include the set of tags.

A search is generally initiated by an information request. The information request can be received from a user or can be generated from an agent search. The information request is parsed to identify terms in the request. The terms are predetermined and correspond to the domains and categories of the index. The terms are mapped to XML tags. Once the terms are mapped to the XML tags, a determination is made as to whether the XML tags indicate that the request is ambiguous. The XML tags can indicate that the request is ambiguous if a single term in the request is related to more than one XML tag. If the XML tags indicate that the request is ambiguous, then the XML tags are used to conduct a query to determine the appropriate XML tags. The query may include querying the user for additional information.

Once the appropriate XML tags are identified, then the metafiles that correspond to those XML tags are identified. Each metafile is examined to determine whether the XML tags in the metafile indicate that there are any related domains or categories. If there are a number of related XML tags in a metafile and the request does not clearly identify one of the related XML tags, then the metafile is used to supply information to a disambiguation process that identifies the tags that should be used to conduct the search. Once the query has been conducted to identify one of the XML tags, then that XML tag is combined with the other XML tags identified by the metafile and any other queries to create a unique key. The key is used to search the database to locate records that include the XML tags in their XML Index Component. Once the records are located, the records are delivered to the requesting user or search agent.

These and other aspects, features and advantages of the present invention may be more clearly understood and appreciated from a review of the following detailed description of the disclosed embodiments and by reference to the appended drawings and claims.

DETAILED DESCRIPTION OF THE INVENTION

The present invention is directed to a method for locating information stored in a database, and more particularly to using an index that includes tags and metafiles to locate the desired information. In general, an index is essentially a guide that is used to locate information stored in a database, such as a database of classified advertising information, consumer business information or information related to electronic commerce ("e-commerce"). As is further defined below, an exemplary index may include categories and domains, as well as terms. In one exemplary index, the index has one or more categories, such as the Cuisine category or the Brand category. A category is basically a group of terms. A term may appear in more than one category, but a term may only appear once in any given category. For example, the term "American" may appear in the Cuisine category and in the Brand category, but may only appear once in the Cuisine category.

The index also has one or more domains. A domain is generally described as a grouping of categories. For example, the Restaurant domain may include the Cuisine category and, therefore, the terms "Mexican" and "American." The domains, categories, and terms are used to locate information within the database.

In one embodiment, the index is created so that a tag, such as an XML (eXtensible Markup Language) tag, is associated with each domain (a domain tag) and with each term associated with a category (a category tag). For example, an XML tag is created for the Restaurant domain and an XML tag is created for the American Cuisine category. In addition, many of the tags have an associated metafile. A metafile includes a list of related tags, such as related domain tags, category tags and hierarchy tags. A hierarchy tag establishes a hierarchy within the tags of the metafile.

Each record of the database includes an index component which lists the domain tags and category tags that ate associated with that record. When a search request is received, a set of tags that correspond to the request are identified. The set of tags is compiled as a key and is used to search the database to locate records that include the set of tags in their index component.

Exemplary Operating Environment

Figure 1A:
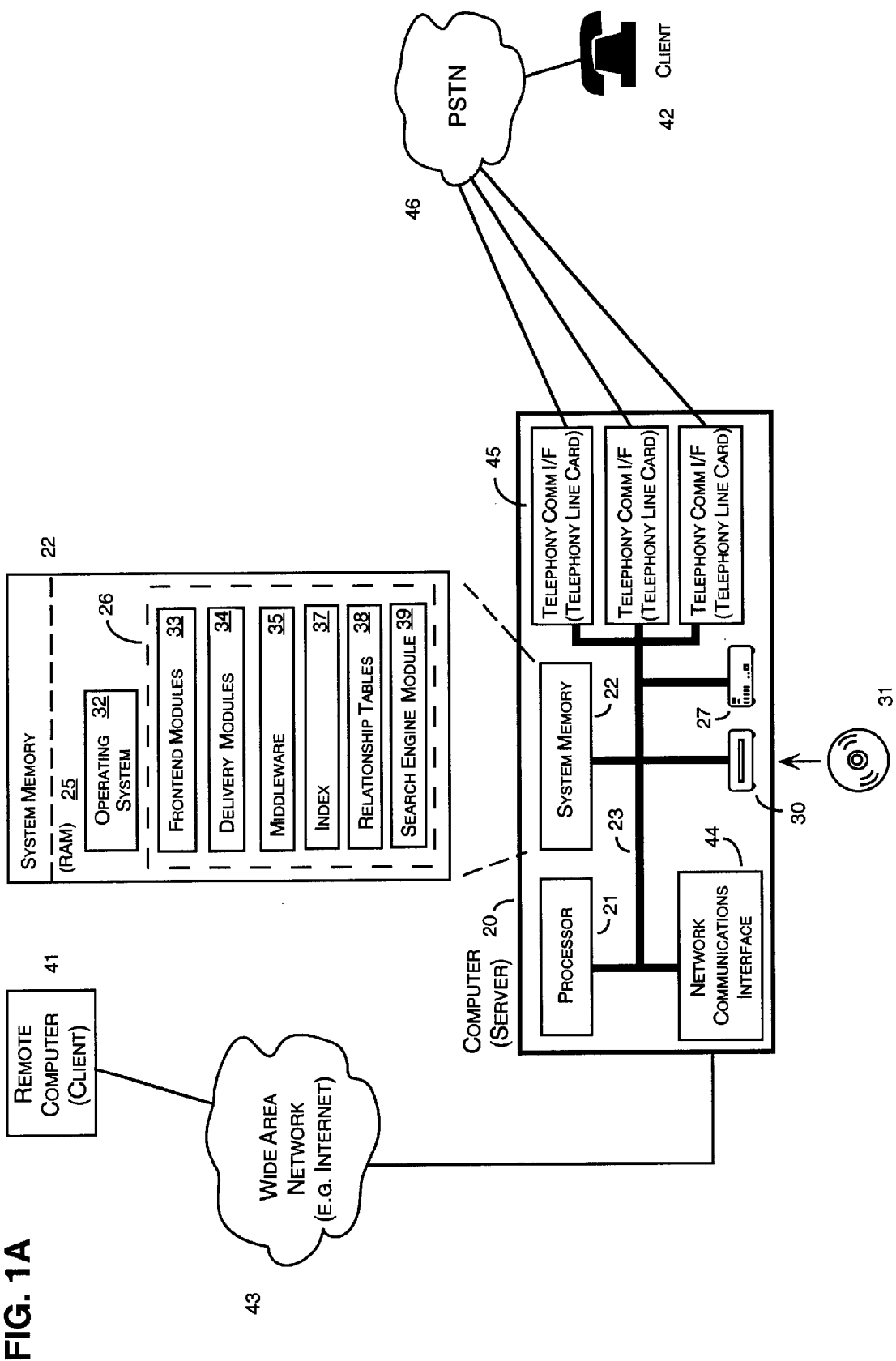
FIG. 1A is a block diagram of a personal computer illustrating an exemplary operating environment for an embodiment of the present invention.
Figure 1B:
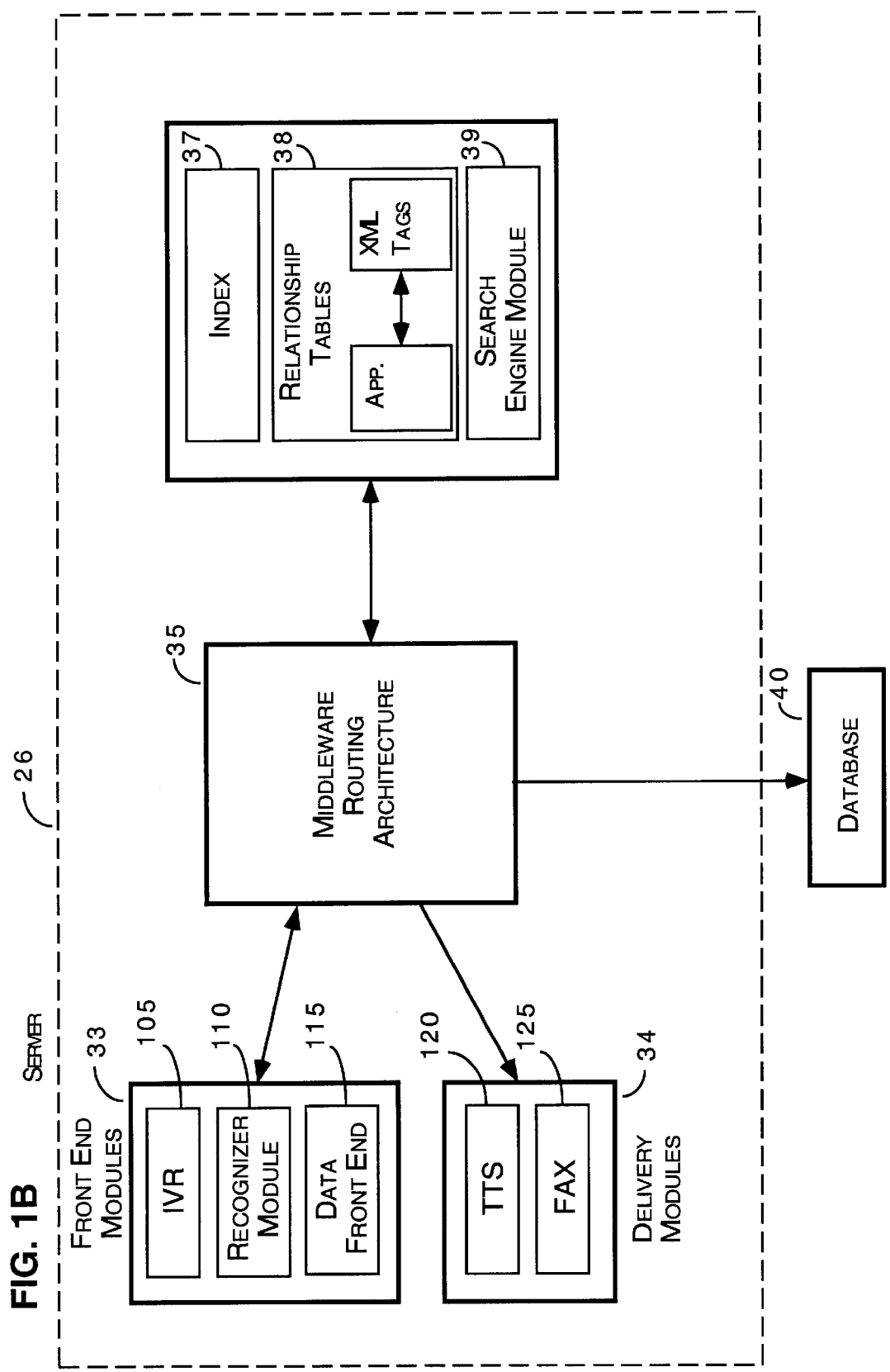
FIG. 1B is a block diagram illustrating the software components for an exemplary embodiment of the present invention.

FIGS. 1A and 1B and the following discussion are intended to provide a brief, general description of an exemplary computing operating environment in which the present invention may be implemented. Embodiments of the invention are described in the general context of software program modules that run on an operating system in conjunction with a computer. Generally, program modules include routines, programs, components, data structures, etc., that perform particular tasks or implement particular abstract data types. Moreover, those skilled in the art will appreciate that the invention may be practiced with other computer system configurations, including multiprocessor systems, other microprocessor-based or programmable electronic devices, minicomputers, mainframe computers, and the like. Those skilled in the art will appreciate that FIGS. 1A and 1B and the associated discussion are intended to provide a brief, general description of exemplary computer hardware and program modules, and that additional information is readily available in the appropriate programming manuals, users guides, and similar publications.

Referring now to FIG. 1A, an exemplary computer system for implementing the present invention includes a conventional computer 20, including a processor 21, a system memory 22, and a system bus 23 that couples the system memory 22 to the processor 21. Although not shown in FIG. 1A, the exemplary computer system for implementing the present invention may include additional processors, each of which are coupled to the system memory 22. In this alternative configuration, the additional processors are deemed to be adjunct processors capable of being dedicated to particular software processes concurrently executing within the computer 20.

The system memory 22 includes random access memory ("RAM") 25. The computer 20 further includes a hard disk drive 27 and an optical disk drive 30 (e.g., a disk drive that reads from a CD-ROM disk 31 or reads from or writes to other optical media). The hard disk drive 27 and the optical disk drive 30 are connected to the system bus 23. The drives and their associated computer-readable media provide non-volatile storage for the computer 20. Although the description of computer-readable media above includes the hard disk drive 27 and the optical disk 31, such as a CD, it should be appreciated by those skilled in the art that other types of media, which are readable by a computer, may also be used in each of the exemplary operating environments described with regard to FIG. 1A.

A number of program modules may be stored in the drives 27, computer-readable 31, and RAM 25, including an operating system 32 and a variety of other software program modules. In an embodiment of the present invention, an example of such software modules is a group of software modules collectively referred to as interactive information retrieval system modules 26 (IR system modules). The IR system modules 26 preferably include the following software modules:

one or more front end modules 33, one or more delivery modules 34, a middleware layer of software 35 for routing information and requests between the IR system modules 26, an index 37, relationship tables 38, and a search engine module 39 for searching a database 40 stored on the hard disk drive 27 or on the optical disk 31 in the optical disk drive 30.

The operating system 32 provides the basic interface between the computer's hardware and software resources, the user, and the IR system modules 26. In the exemplary operating environments described with regard to FIG. 1A, the operating system 32 is preferably a real-time operating system. A real-time operating system is desired in order to provide adequate response when searching and interacting with multiple users. Those skilled in the art will appreciate the need for real-time, multithreaded performance in information retrieval applications in order to support an adequate level of transactional performance.

As with most conventional computer systems, a user may enter commands and information into the computer 20 through a keyboard (not shown) and an input or pointing device, such as a mouse (not shown). These and other input devices are often connected to the processor 21 through a serial port interface (not shown) connected to the system bus 23. A monitor (not shown) or other type of display device can also be connected to the system bus 23. In addition to the monitor, computers such as the computer 20 typically include other peripheral output devices (not shown), such as printers and backup devices.

In the exemplary embodiment, a user typically interacts with the computer 20 when the computer 20 functions in a server capacity. In this capacity, the computer 20 can service a remote programmable device (such as a remote computer 41), or a telecommunications device (such as a conventional telephone 42) via a voice recognition interface, each of which is logically connected to the computer 20.

The remote computer 41 may be a server, a router, a peer device, or other common network node. Typically, the remote computer 41 includes many or all of the elements described relative to the standalone computer 20. The logical connection between the remote computer 41 and the computer 20 depicted in FIG. 1A is a data communications network, such as a wide area network ("WAN") 43. Other examples of data communications networks include enterprise-wide computer networks, intranets, or the global Internet. A communications interface, such as a network communications interface 44 in the computer 20, links the WAN 43 and the computer 20. However, the logical connections to the computer 20 may also be a local area network ("LAN") (not shown) that is commonplace in offices. Typically, a user of the remote computer 41 interacts with the computer 20 via such logical connections in order to search the database 40 for information.

A telephony communication interface 45 (also known as a telephony line card) connected to a conventional public switched telephone network 46 ("PSTN") provides the logical connection between the computer 20 and the conventional telephone 42. In this manner, the user can interact with the computer 20 with voice responses via a conventional telephone 42 or other telephonic device. In the preferred embodiment, the telephony communication interface 45 is a Model D/160SC-LS telephone line interface card having an Antares 2000/50 digital signal processing ("DSP") card, both of which are manufactured by Dialogic Corporation of Parsippany, N.J. Both the network communications interface 44 and the telephony communication interface 45 are generally referred to as "communication interfaces" because the computer 20 provides the service of processing data inquiries through both of these interfaces. It will be appreciated that the network and telephone connections shown are exemplary and other means of establishing a communications link between the computer 20 and the remote computer 41 or conventional telephone 42 may be used.

From this brief description, it should be appreciated that operating systems and networking architectures are quite complex and provide a wide variety of services that allow users and programs to utilize the resources available in the computer or in other computers in a distributed computing environment. Those skilled in the art will be familiar with operating systems, networking architectures and their various features. Likewise, those skilled in the art will appreciate that the IR system modules 26 provide a wide variety of features and functions in addition to those included in the brief description presented above.

Software Modules of the IR System

The software modules of the IR system 26 are shown in FIG. 1B. The software modules are used to process a search request and search the database 40. The front end modules 33 receive the user's search request. The search request is processed using the index 37, the relationship tables 38, and the search engine 39. Once the records satisfying the search request are located, the records are delivered to the user via one of the delivery modules 34. The middleware routing architecture 35 connects the front end modules 33 and the delivery modules 34 to the index 37, the relationship tables 38, and the search engine module 39.

The user makes a search request or an information request by communicating with the computer 20 via ,the conventional telephone 42 or via the remote computer 41. The user's search request is handled by one of the front end modules 33. If the user'communicates via the PSTN 46, the module receiving the information may be an interactive voice response ("IVR") module 105 and the recognizer module 110. If the communication path is via the WAN 43, the module receiving the information may be the data front end module 115. The delivery modules 34 are used to return the information located by the search to the user. The information can be transmitted via a text-to-speech ("TTS") module 120, via a facsimile module 125 or via a remote computer 41 using a GUI interface.

The index 37 is essentially a guide to the records of the database 40. The index includes a number of tags and metafiles associated with the tags. A tag is generally associated with data or text and conveys information about the data or text. A metafile is associated with a tag and provides additional information about the data or text described by the tag. A metafile includes tags to create an association with the tag or to imbed intelligence into the search process. A metafile can also include other types of data, such as data describing the type of association. In the exemplary embodiment discussed herein, the index uses XML (eXtensible Markup Language) tags and XML metafiles that include additional XML tags. The relationship tables 38 define the relationships between the XML tags of the index and the applications.

The index 37 includes domain tags, category tags, and hierarchy tags. In the exemplary embodiment discussed herein, the tags follow the organization of a classified advertising directory or an e-commerce based system. Categories are basically groups of terms. A term can be associated with more than one category, but a single term cannot be repeated within a category. For example, the term "American" can be associated with the Cuisine category, as, well as the Brand category. The category tags typically describe information that is common to a number of business, such as hours of operation, type of payment accepted, years in business at the same location, etc. However, as will be apparent to those skilled in the art, alternative organizations are also possible.

Sample categories and terms are shown below in Table 1.

TABLE 1

| Terms | Type of Category |
|---|---|
| FORD | Brand |
| NIKE | Brand |
| Chinese | Cuisine |
| AMERICAN EXPRESS | Payment Option |
| Valet Parking | Amenity |

The index also comprises domains, such as Restaurant and Automobile. In an exemplary embodiment, a domain can correspond to a line of business listing in a classified advertising directory. A domain, such as the Restaurant domain, is essentially a grouping of categories and the respective associated terms. For example, the Restaurant domain is associated with categories, such as Cuisine, Operating Hours, and Amenities, and the respective associated terms, such as Mexican, Chinese, and American (for Cuisine). Each domain can have categories that are associated with other domains.

The hierarchy tags establish a hierarchy between the tags in the metafile. The hierarchy is used to guide a user through the process of searching the database. Typically, a default hierarchy is established for each domain. For example, in the Restaurant domain, the Cuisine category tags have priority over the Geography category tags and the Geography category tags have priority over the Amenities category tags. Although the hierarchy tags implement a default priority, a user can override the default priority to search for information using a different priority. Thus, a user could search for information about a restaurant that is located nearby regardless of the type of cuisine served.

An alternative organization to the organization of a classified advertising directory or an e-commerce based system could be based on trade names or brands. In a typical classified advertising directory or e-commerce based system, each business entity is listed by domain and category. In a trade name or brand organization, the business entities that are related to a particular trade name or brand are listed together. Consider the HONDA brand of automobiles, lawnmowers and motorcycles. In a classified advertising directory or e-commerce based system a seller of HONDA automobiles would be listed in a separate domain (automobile) than a seller of HONDA lawn mowers (lawn mower). However, in a trade name or a brand directory, all dealers, service providers and parts providers would. be listed together in a single location under the HONDA brand.

Figure 2:
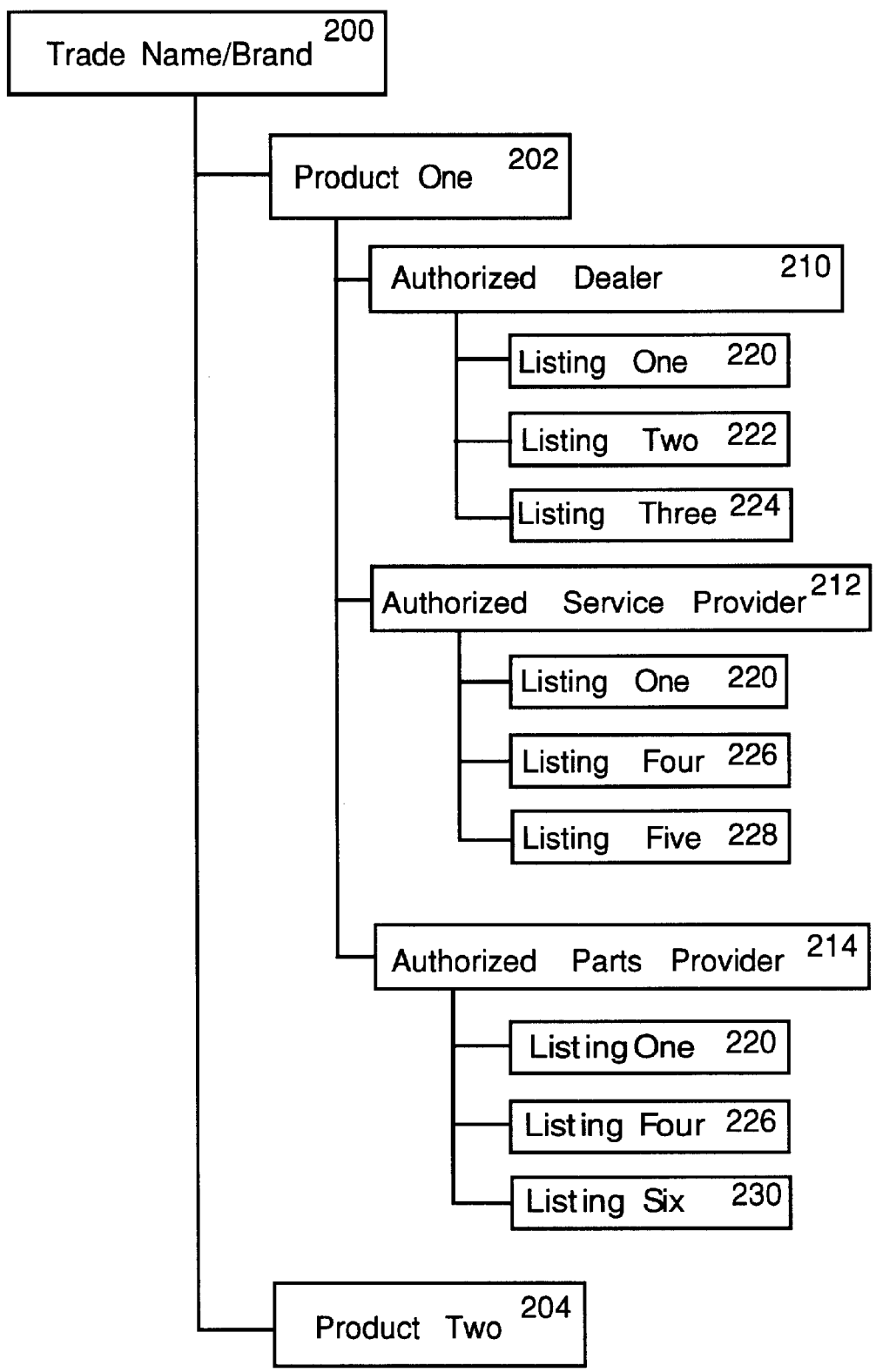
FIG. 2 is a block diagram illustrating the logical organization of information, in accordance with an embodiment of the present information.

As shown in FIG. 2, the various products, such as product One 202 and Product Two 204, are collected under the Trade Name/Brand listing 200. In the HONDA example, Product One may correspond to automobile and Product Two may correspond to lawn mower, and a third product, Product Three (not shown) may correspond to motorcycle. Underneath each product are additional classifications, such as Authorized Dealer 210, Authorized Service Provider 212 and Authorized Parts Provider 214. Under the Authorized Dealer classification 210 are listings for individual authorized dealers 220, 222, 224. Under the Authorized Service Provider classification 212 are listings for authorized service providers 220, 226, 228. Under the Authorized Parts Provider classification 214 are listings for authorized parts providers 220, 226, 230. The listings under the Authorized Dealer classification 210 may overlap with the listings under the Authorized Service Provider classification 212 and/or the Authorized Parts Provider classification 214. For example, Listing One 220 appears under the Authorized Dealer classification 210, as well as the Authorized Service Provider classification 212 and the Authorized Parts Provider classification 214.

In one embodiment, an organization based on trade names or brands can be implemented by associating an XML tag with each trade name/brand, product, and classification. The XML tag that is associated with the trade name/brand has an associated metafile that includes the tags for the related products and classifications. The metafile can also establish a hierarchy by prioritizing the product tags and classification tags of the metafile.

As will be apparent to those skilled in the art, other classifications can also be used with trade names or brands. For example, if the trade name corresponds to a trade name for a sporting goods manufacturer, then the classifications underneath the trade name/brand could correspond to different sports, such as golf, tennis, baseball.

XML and Metafiles

In the exemplary embodiment discussed herein, the index includes a set of eXtensible Markup Language (XML) tags and metafiles. XML is a syntax for creating a markup language that uses a set of tags. XML is a subset of the Standard Generalized Markup Language (SGML). The XML standard is maintained by the World Wide Web Consortium ($W^3C$).

XML can be used to create a markup language that includes tags that specify the meaning of a piece of information and the relationship of the information to other information, rather than just describing how that piece of information should be displayed or printed. For example, an XML tag can describe a piece of information as information about an author rather than just describing that the piece of information is to be displayed in italics. XML supports the description of information in a hierarchical, structured manner. XML can be used to create a universal search vocabulary using a common set of XML tags so that an IR system can access information located in any database that uses the common set of XML tags.

An XML metafile provides additional information about the information identified by the XML tag. Each XML tag can have an associated metafile. In the exemplary embodiment discussed herein, a metafile includes one or more XML tags. Although each XML tag can have an associated metafile, in some implementations there may be XML tags that do not have associated metafiles. The XML tags included in the metafile identify related XML tags or further define the XML tag.

Figure 3A:
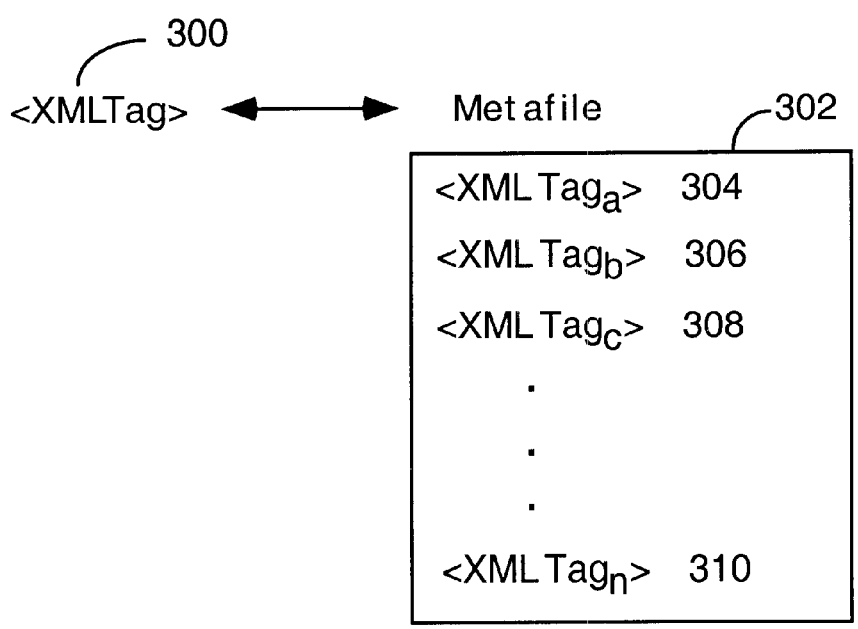
FIGS. 3A and 3B are block diagrams illustrating the relationship between a tag and a metafile, in accordance with an embodiment of the present invention.

FIG. 3A shows an XML tag (<XML Tag>) 300 and its associated metafile 302. The metafile includes <XML $Tag_a$> 304, <XML $Tag_b$> 306, <XML $Tag_c$> 308, through <XML $Tag_n$> 310. A single XML tag, such as <XML $Tag_a$> 304, may appear in a number of metafiles. The number and type of XML tags that are included in the metafile will be determined by the specific XML tag 300.

Figure 3B:
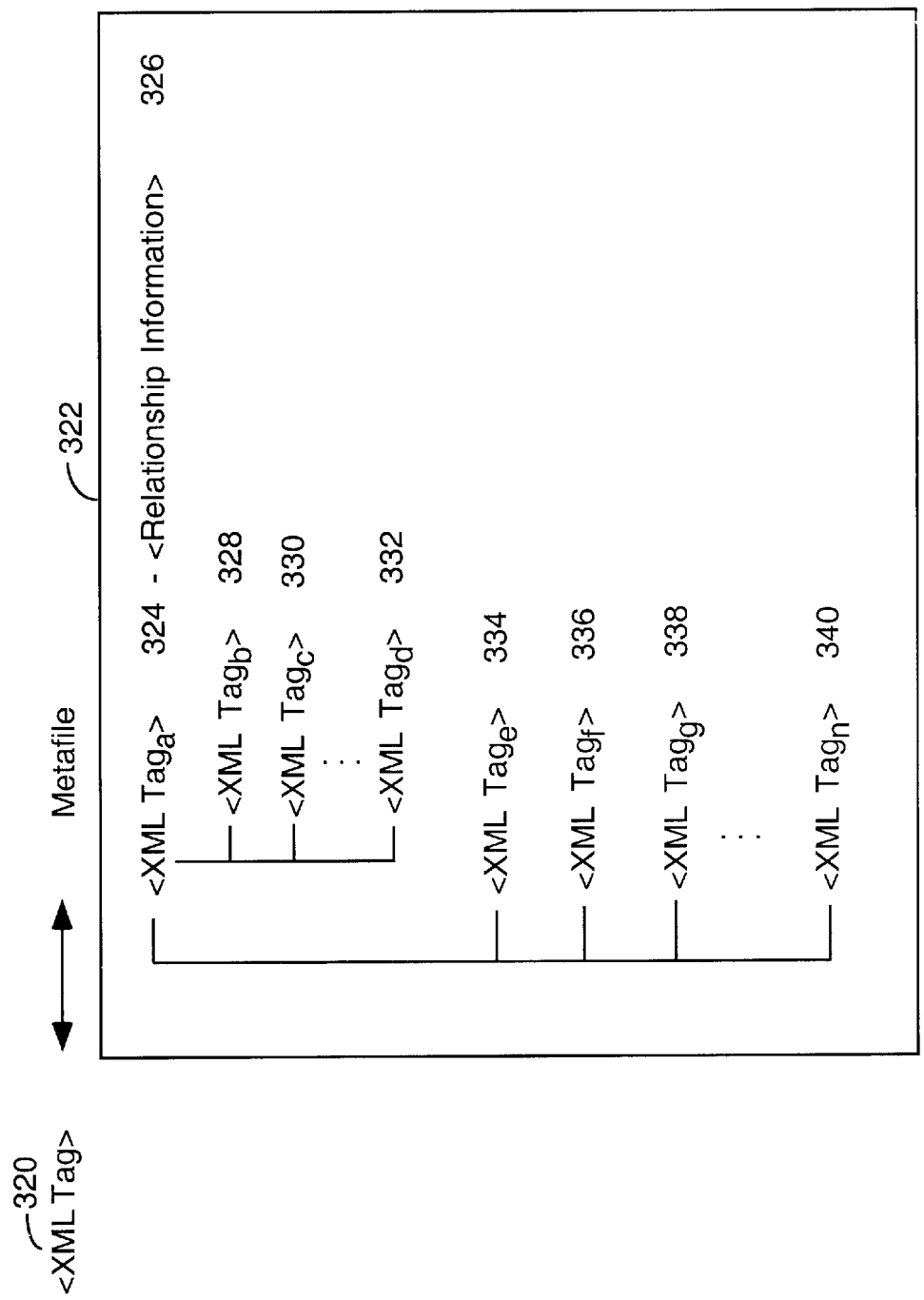

FIG. 3B shows <XML Tag> 320 and its associated metafile 322. The metafile 322 includes a number of tags, <XML $Tag_a$> 324, <XML $Tag_b$> 328 through <XML $Tag_n$> 340, as well as <Relationship Information> 326. The relationship information is associated with a particular XML tags and provides information about the relationship between two XML tags, such as <XML Tag> 320 and <XML $Tag_a$> 324. Although not shown in FIG. 3B relationship information can be associated with other XML tags in the metafile. The XML tags can be used to establish a hierarchy so that <XML $Tag_a$> 324 has priority over <XML $Tag_b$> 328, <XML $Tag_c$> 330 . . . <XML $Tag_d$> 332. In addition, <XML $Tag_a$> 324, has priority over <XML $Tag_e$> 334, <XML $Tag_f$> 336, <XML $Tag_g$> 338 . . . <XML $Tag_n$> 340. In one embodiment, <XML Tag> 320 corresponds to a Restaurant domain tag and <XML $Tags_{e-n}$> correspond to category tags, such as Cuisine, Geography, Price and Amenities. In addition, <XML $Tag_a$> corresponds to a related domain and the relationship information provides further information about the relationship between the Restaurant domain and the related domain. The hierarchy of the XML tags in the metafile can be used by an application to prioritize the search criteria. As will be apparent to those skilled in the art, other tags and hierarchies can be included in the metafile.

The XML tags shown in FIGS. 3A and 3B and used herein are only descriptive in nature. The actual XML tags used conform to the XML syntax and standards, as established by the appropriate standards bodies (e.g. the World Wide Web Consortium).

An Exemplary Database Record

The present invention provides a method for searching a database comprising a number of records. Each record contains specific information. An example of such information using the organization of a classified advertising directory or an e-commerce based system is information about a restaurant describing the type of cuisine served, location, hours of operation, payment methods accepted, and amenities offered. Another example is information about an automobile sales center describing the brand of automobile it sells, the models it sells, and its hours of operation. In the exemplary embodiment, each record is an XML document.

Figure 4A:
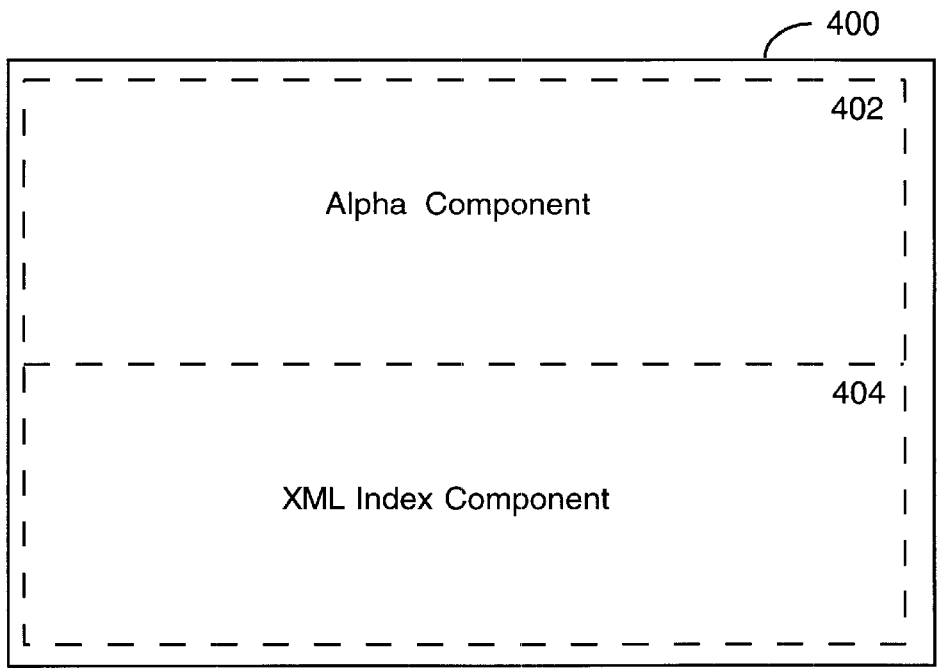
FIGS. 4A and 4B are block diagrams of an exemplary record in a database, in accordance with an embodiment of the present invention.

FIG. 4A illustrates an exemplary database record 400. The database record 400 includes an Alpha Component 402 and an XML Index Component 404. The Alpha Component 402 contains identifying information for the record and the XML Index Component 404 includes XML tags that are associated with the record.

Figure 4B:
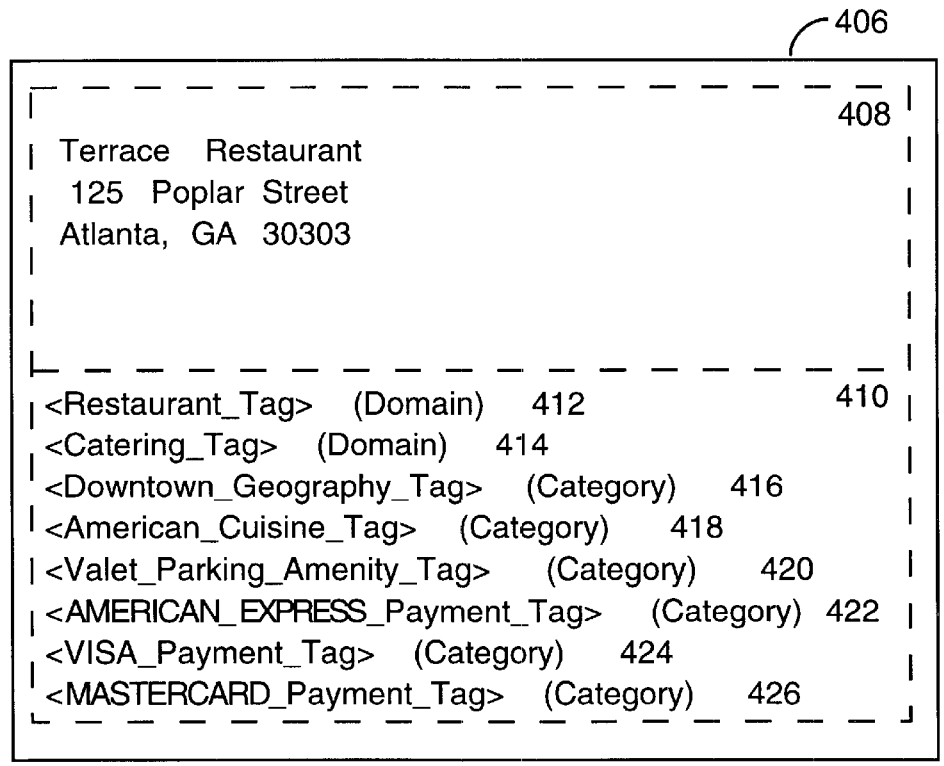

An example of a database record for a restaurant is shown in FIG. 4B. The record 406 shown in FIG. 4B includes an Alpha Component 408 and an XML Index Component 410. In this example, the identifying information contained in the Alpha Component includes a business name (Terrace Restaurant), as well as an address (125 Poplar Street, Atlanta, Ga. 30303) and telephone number (404/828-4373). The XML Index Component 410 includes a number of domain tags and category tags.

The domain tags shown in FIG. 4B include the Restaurant domain tag (<Restaurant_Tag>) 412 and the Catering domain tag (<Catering_Tag>) 414. The category tags include the Downtown Geography category tag (<Downtown_Geography_Tag>) 416, the American Cuisine category tag (<American_Cuisine_Tag>) 418, the Valet Parking Amenity category tag (<Valet_Parking_Amenity_Tag>) 420, the AMERICAN EXPRESS Payment Option category tag (<AMERICAN_EXPRESS_Payment_Tag>) 422, the VISA Payment Option category tag (<VISA_Payment_Tag>) 424, and the MASTERCARD Payment Option category tag (<MASTERCARD_Payment Tag>) 426. The Restaurant domain tag 412 identifies the Terrace Restaurant as a restaurant. The Catering domain tag 414 indicates that the Terrace Restaurant provides catering services. The Downtown Geography category tag 416 indicates that the Terrace Restaurant is located downtown. The American Cuisine category tag 418 indicates that the Terrace Restaurant serves American cuisine. The Valet Parking Amenity category tag 420 indicates that the Terrace Restaurant provides valet parking. The AMERICAN EXPRESS Payment Option category tag 422 indicates that the Terrace Restaurant accepts AMERICAN EXPRESS charge cards, the VISA Payment Option category tag 424 indicates that the Terrace Restaurant accepts VISA credit cards and the MASTERCARD Payment Option category tag 426 indicates that the Terrace Restaurant accepts MASTERCARD credit cards.

In an exemplary embodiment, a number of records similar to the record shown in FIG. 4B are stored within the database. Each record has identifying information in its Alpha Component that is similar to that shown in FIG. 4B. Additional identifying information could also be included in the Alpha Component, such as a facsimile number or an Internet address. The number and type of tags included in the XML Index Component is determined by the particular record. For a record corresponding to another restaurant, the number and the types of tags may differ. For example, if the other restaurant does not provide catering services, then the catering domain tag will not appear in the XML Index Component for that record.

For records corresponding to entities other than restaurants, different types of tags can be used, as will be apparent to those skilled in the art. For example, a record that corresponds to an automobile sales center may include tags that correspond to the brand of automobiles leased or sold (Brand category), automobile repair (Repair category), and automobile parts (Parts category).

Creating an Index Using XML Tags and Metafiles

Figure 5:
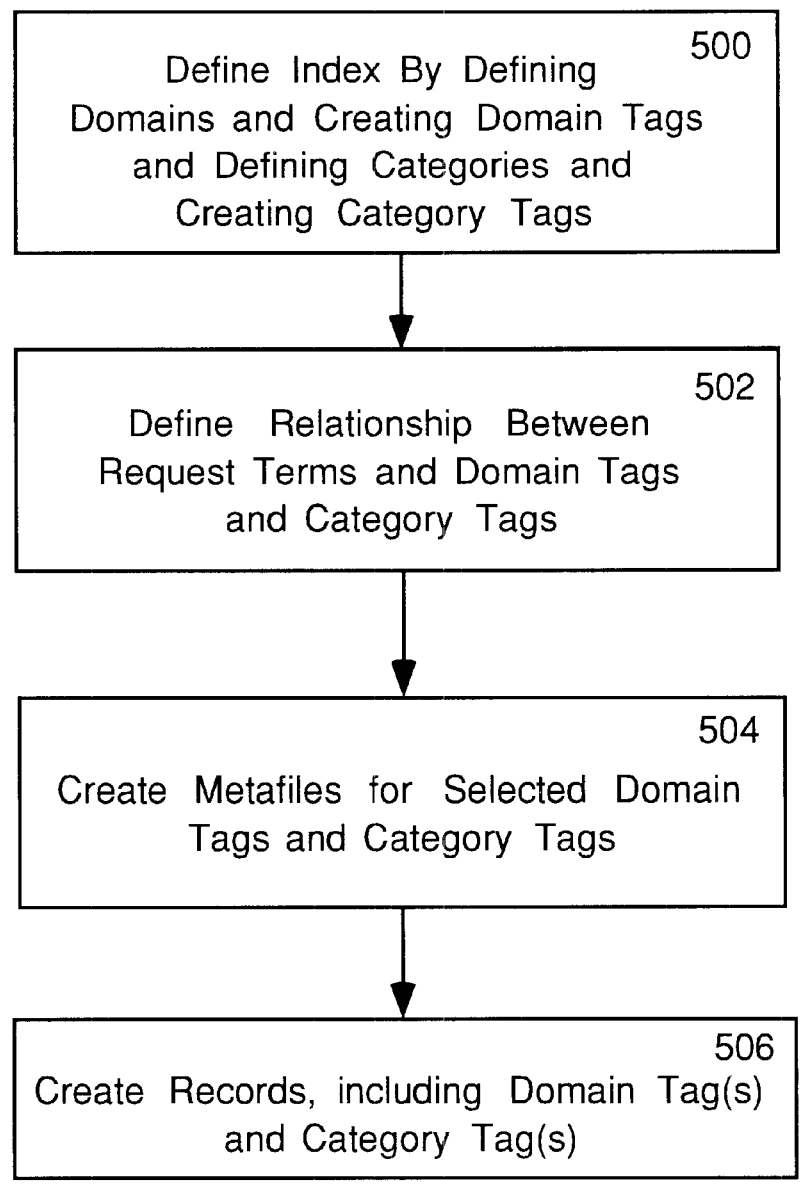
FIG. 5 is a flow chart illustrating the steps for creating a database and an index, in accordance with an embodiment of the present invention.

FIG. 5 illustrates the steps for creating an index, including XML tags and metafiles, that can be used to search a database. In step 500, the index is defined by defining the XML tags for the index. The XML tags include domain tags and category tags. An advantage of using XML tags is that XML is a platform independent-language that can be run on a number of systems. XML can be used to create a universal search vocabulary that can be used to search information stored in a variety of databases. The index can be used to create a vocabulary that can expand traditional information categories. For example, in addition to creating tags for cities and other municipalities, tags can also be created that identify communities, such as the Buckhead Community in Atlanta, or a landmark, such as Turner Field.

In step 502, the relationship between the request terms and the XML tags defined in step 500 are defined. The request terms are the terms that can be recognized from an initial request for information. In some instances, the request terms may be very similar to the XML tags. For example, the term "restaurant" in a request is mapped to the Restaurant domain tag. In other instances, the relationship between a request term and an XML tag can be defined to provide an additional function, such as identifying the term "coffee shop" as a synonym for restaurant. The relationship between a request term and an XML tag can also be used to recognize local idioms. For example, if a certain street is known locally as "old US 1", then a relationship can be defined that maps the term "old US 1" to $4^{th}$ Street. In addition, the relationship between a request term and an XML tag can be defined to include misspellings. For example, the term "resterent" can be defined as a misspelling of restaurant. The relationship between a request term and an XML tag can also be used to provide language translation. For example, if the request for information includes the term "trattoria" (an Italian word for restaurant), then the term trattoria could also be mapped to the Restaurant domain tag. In one embodiment, separate translation files are used to implement synonym, local idiom, misspelling and language translation to optimize the search of the database.

In step 504, metafiles are created for selected domain tags and category tags that were defined in step 500. A metafile includes one or more XML tags that are related to the selected XML tag. For example, the Restaurant domain tag may have an associated metafile that includes XML tags that define other related domain tags and category tags. A metafile for a particular XML tag can be created manually by using data gathered from observation. For example, a metafile can be created by observing the types of information that a user typically considers when selecting a restaurant. If a user typically considers the type of cuisine served, the payment methods accepted, and the amenities offered when selecting a restaurant, then XML tags for these types of information are included in the metafile that corresponds to the Restaurant domain tag. By including tags that are associated with the type of information that a user typically considers when choosing a restaurant in the metafile, the search method can focus efficiently on records that satisfy the user's search request.

In addition, a hierarchy between the tags in the metafile can be created in Step 504. The hierarchy is use d to query the user for additional search criteria to focus the search on the most relevant information. For example, if a user requests information about restaurants, the user is queried for additional search terms related to cuisine and geography so that the user is not overwhelmed with information about restaurants. One method for creating an ordered set of questions that can be used to prompt a user for additional search criteria is described in U.S. Pat. No. 5,878,423, entitled "Dynamically Processing an Index to Create an Ordered Set of Questions."

The tags included in a metafile may also be influenced by the steps typically performed by a user to locate information. Consider a user that is trying to locate information about catering services. The user might formulate a request that includes the term "catering." Alternatively, the user might formulate a request that uses the term "restaurant" rather than catering. If the metafile for the Restaurant domain tag includes the Catering domain tag, then the user can clarify if the user wants information on restaurants or catering. By including related tags in the metafile, the search method can eliminate ambiguity in the search request and can provide information about related domains.

In a commerce environment, the tags included in a metafile may also be used to cross-sell or cross-market items. For example, a metafile corresponding to the Catering domain tag, may include a Florist domain tag, a Balloon domain tag, and a Musician domain tag. If the user is trying to locate information about catering, it is possible that the user is planning a party. By including tags for the Florist domain, the Balloon domain, and the Musician domain, the metafile can be used to present the user with the option of locating information about related products and services that the user may desire.

Finally, in step 506, the individual records for the database are created. The records include one or more domain tags and category tags, as discussed in more detail above.

Method for Searching a Database

Figure 6A:
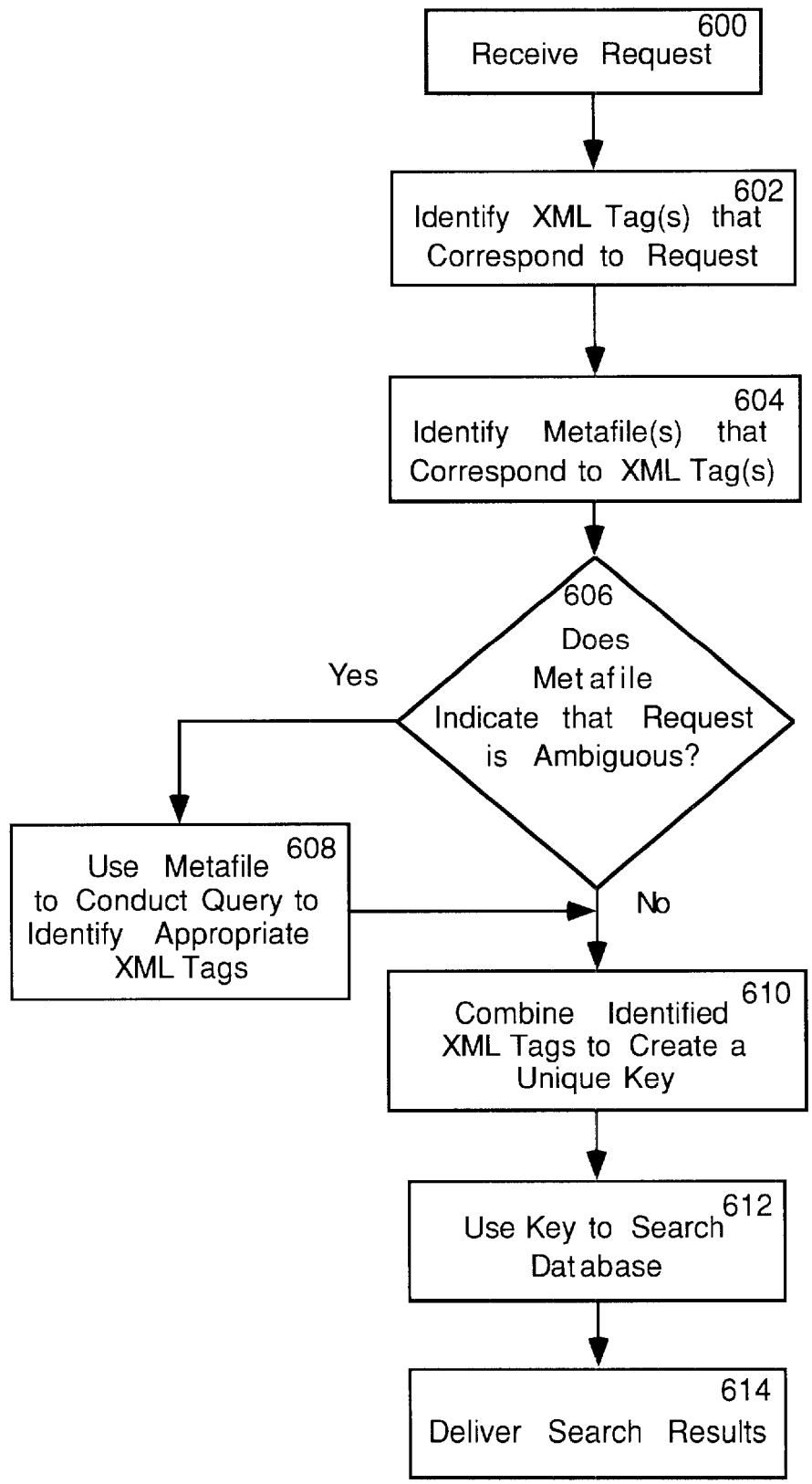
FIGS. 6A, 6B, and 6C are flow diagrams illustrating the steps for searching a database, in accordance with an embodiment of the present invention.
Figure 6B:
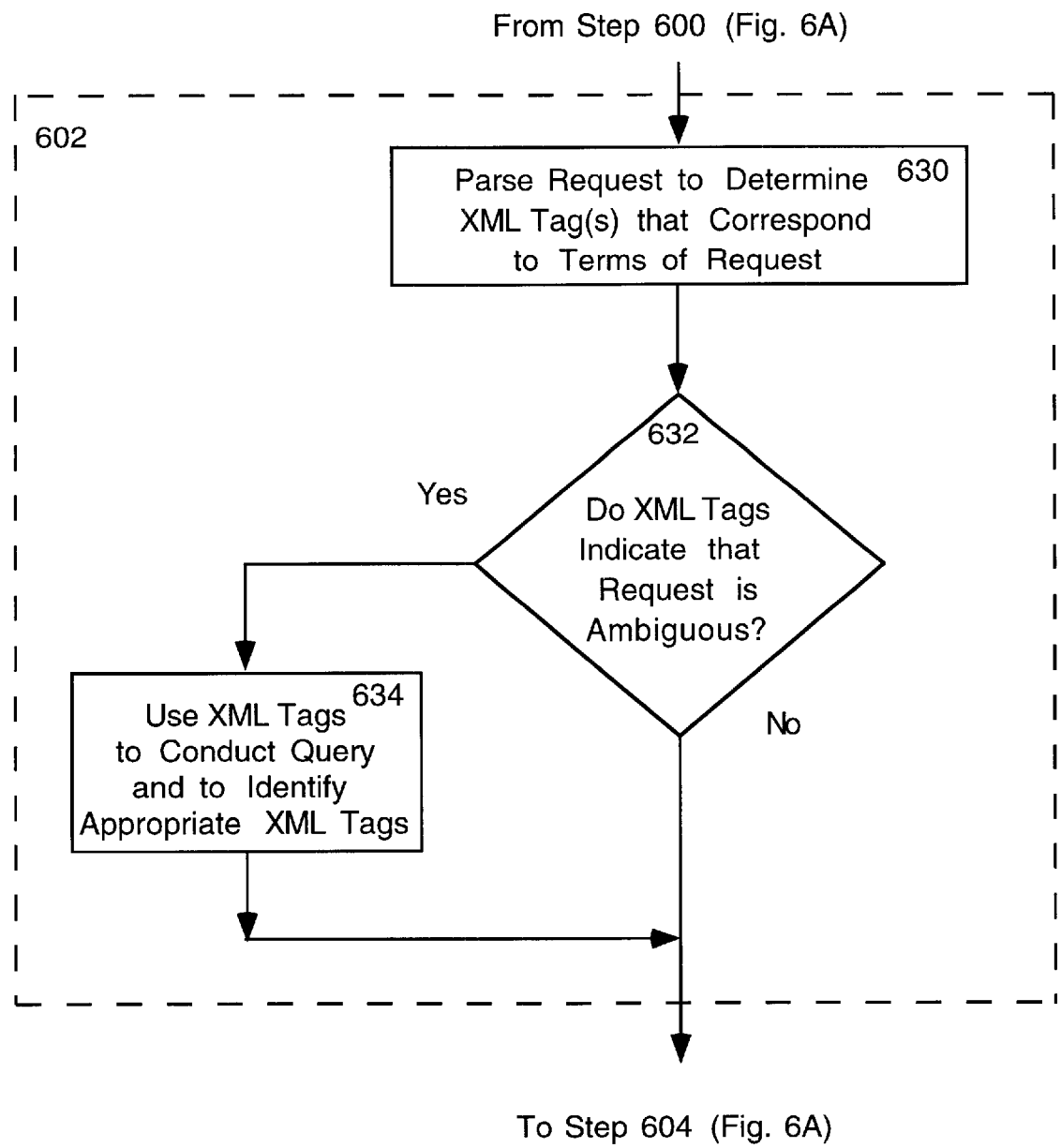
Figure 6C:
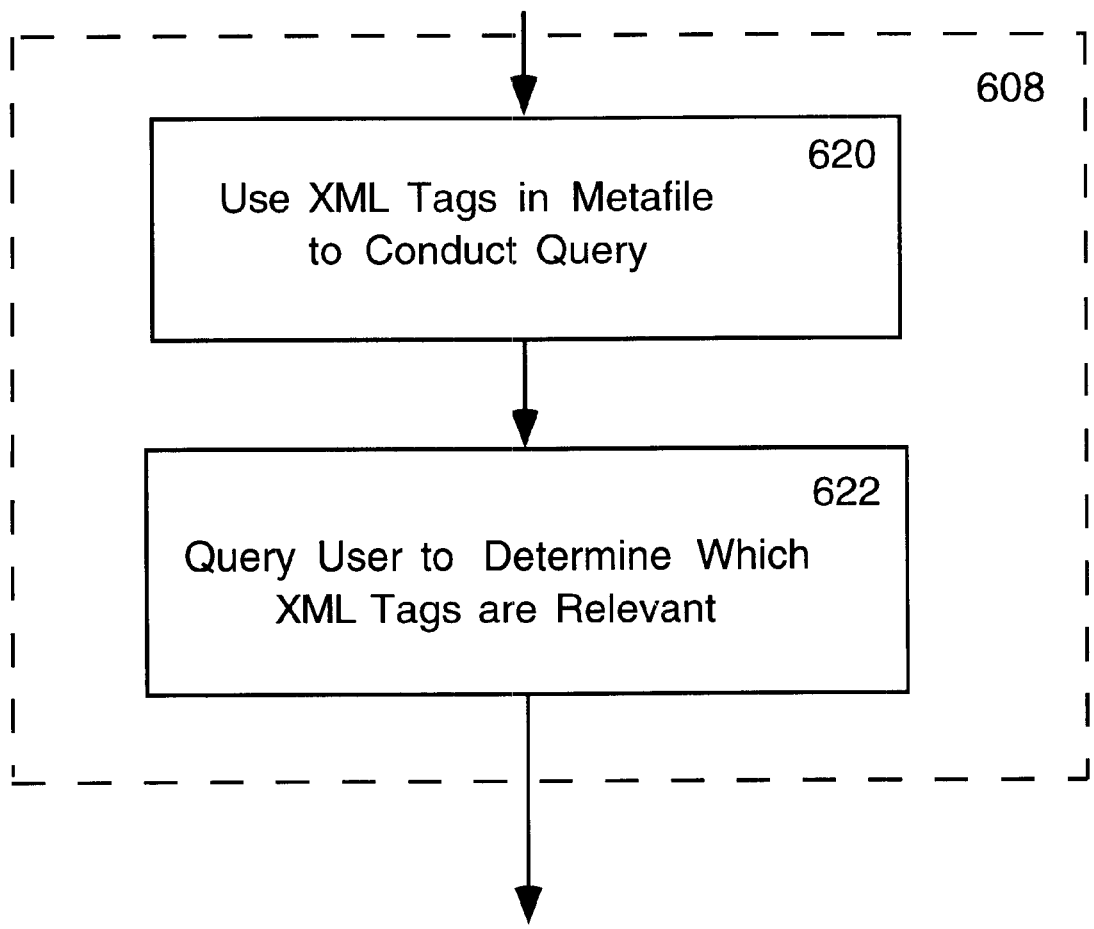

FIGS. 6A–C illustrate exemplary steps for locating information in a database using an index including XML tags and metafiles. In step 600, an information request is received. Typically the information request is received from a user. The user can enter the request using a computer by typing the information on the keyboard, by selecting search terms from a menu, or by entering voice commands. Alternatively, the user can enter the request via a telephone. In addition, the request could come from an agent search that was initiated on a network, such as the Internet. The information request can come in a variety of formats. For example, if the user enters the information request using a computer, the request may be entered by completing a number of fields on a form or the request could be entered by speaking or typing a natural language request. An example of a natural language request would be "locate a Mexican restaurant in Buckhead."

In step 602, the XML tags that correspond to the request are identified. The details of step 602 are shown in FIG. 6B and are discussed in more detail below. Once the XML tags that correspond to the request have been identified, then in step 604, the metafiles that correspond to the identified XML tags are identified.

In step 606, a determination is made as to whether the request is ambiguous. Step 606 examines the metafile identified in step 604 to determine whether the metafile indicates that the request is ambiguous. The request may be ambiguous if the metafile indicates that there are a number of related domains and the request does not clearly indicate one of the domains. For example, if the request includes the term "barbecue" and a metafile that is associated with the Barbecue Cuisine tag identifies the domains for restaurant, restaurant supplies and barbecue equipment, then it is unclear from the single term barbecue whether the request is directed towards a restaurant serving barbecue cuisine, a barbecue catering service, or barbecue equipment.

In this example, the metafile identifies three related domains, the Restaurant Domain, the Catering Domain and the Barbecue Equipment Domain. If there are no additional terms in the request that help clarify the request, the metafile indicates that the request is ambiguous, and the "Yes" branch is followed to step 608. In step 608, the metafile is used to conduct a query to identify one of the related XML tags. Additional details of step 608 are shown in FIG. 6C and are discussed in further detail below. Once the query has been conducted to identify the appropriate XML tags, then the method proceeds to step 610. Alternatively, if the metafile did not indicate that the request was ambiguous, then the "No" branch is followed from step 606 to step 610. In step 610, the XML tags are combined to create a key. The XML tags combined in step 610 may be the tags identified in step 602 and/or the XML tags identified in step 608. In step 612 the key is used to search the database to locate records that include the XML tags. Finally, in step 614 the records that were identified in step 612 are delivered as search results to the user or agent.

FIG. 6B provides additional details of the step of identifying XML tags that correspond to the request received in step 602. As shown in FIG. 6B, once the request is received in step 600, the request is parsed in step 630 to identify terms. As discussed above, the terms are predefined. For example, typical terms for a database that includes classified advertising or e-commerce information may include automobile, restaurant, physician, etc. Once a term is identified in step 630, the XML tag associated with the term is identified.

In step 632, a determination is made as to whether the XML tags identified in step 630 indicate that the request is ambiguous. The XML tags identified in step 630 can indicate that the request is ambiguous if a single term in the request is related to more than one XML tag. For example, if the term "American" is part of the request, then the term "American" is related to the American Cuisine tag, as well as the American Brand tag. If the remaining terms of the request do not clarify which of these category tags correspond to the request, then the determination in step 632 is that the request is ambiguous. However, depending upon the power of the parser, the request may include other terms or text that clarify which category tag is appropriate. For example, if the request indicates that the user wishes to locate an American restaurant, then the American Cuisine tag is the appropriate XML tag.

If the XML tags identified in step 630 do not indicate that the request is ambiguous, then metafiles for the identified XML tags are located in step 604. However, if the XML tags identified in step 630 indicate that the request is ambiguous, then the "Yes" branch is followed to step 634 and the identified XML tags are used to conduct a query to determine the appropriate XML tag. In the example using the term "American," the query could request that the user choose between cuisine or brand. Once the appropriate XML tag is identified, then the method proceeds to identify the metafiles in step 604.

FIG. 6C illustrates additional details of step 608. In step 608, the metafile is used to conduct a query to identify the XML tags of the metafile that are appropriate to the request. In step 620, the XML tags in the metafile are used to conduct the query. For example, if the metafile includes the domain tags for restaurant, catering, and barbecue equipment, then the Restaurant Domain tag, the Catering Domain tag and the Barbecue Equipment Domain tag are used to conduct a query to identify the appropriate domain tag. In this example, the query may ask whether the user is looking for a barbecue restaurant, barbecue catering or barbecue equipment. This query occurs in step 622. Once the query is complete, one of the related domain tags is identified and the others are eliminated. Continuing from step 622, the identified XML tag are used to create the unique key in step 610, whereas the eliminated XML tags are not used to create the key.

Client-Server

Figure 7:
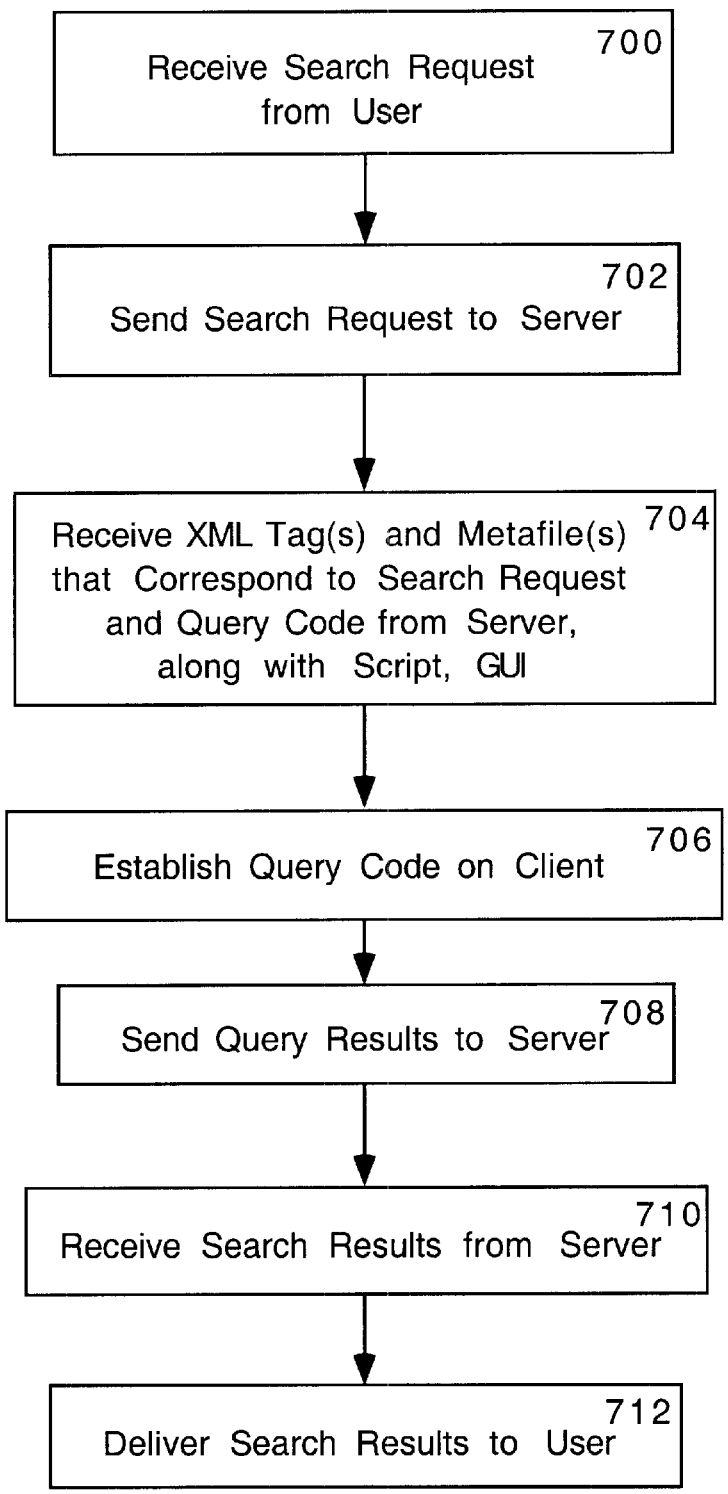
FIG. 7 is a flow diagram illustrating the steps performed by a client system to search a database, in accordance with an embodiment of the present invention.

The present invention is particularly well suited to a client-server environment. The database or databases can reside on a network, such as the Internet, and can be accessed through the server system. A user can initiate a request for information using a client system, such as a personal computer running an Internet browser. As discussed above in connection with FIGS. 6A–6C, it may be necessary to conduct a query with the user to help focus the search. If a query must be conducted with the user, then it is desirable that the query be run as quickly as possible so that the user does not have to wait while the server is accessed. In the client-server environment, the queries to identify the appropriate XML tags are established on the client and the database search is executed on the server. By establishing the query on the client rather than the server, the speed of the query is increased because the query does not require as many communications with the server. FIG. 7 illustrates exemplary steps performed by the client and FIG. 8 illustrates the steps performed by the server to search a database using an embodiment of the present invention.

The client receives a search request from the user in step 700. As discussed above, the search request can be in the form of text input via a computer or voice input via a computer or telephone. Once the client receives the search request from the user, the client sends the search request to the server in step 702. The client then receives XML tags and metafiles that correspond to the search request, as well as query code from the server in step 704. In one embodiment, the query code is written in the JAVA programming language and prompts the user for additional information via pop-up windows. The query code uses the XML tags and the metafiles received from the server to formulate the necessary queries to the user. The query code is executed on the client in step 706. Once the query code is executed, the query results are sent to the server in step 708. The query results include XML tags identified during the query, as well as XML tags previously received from the server. The server then executes a search of the database. The search results are received from the server in step 710 and the search results are delivered to the user in step 712.

Figure 8:
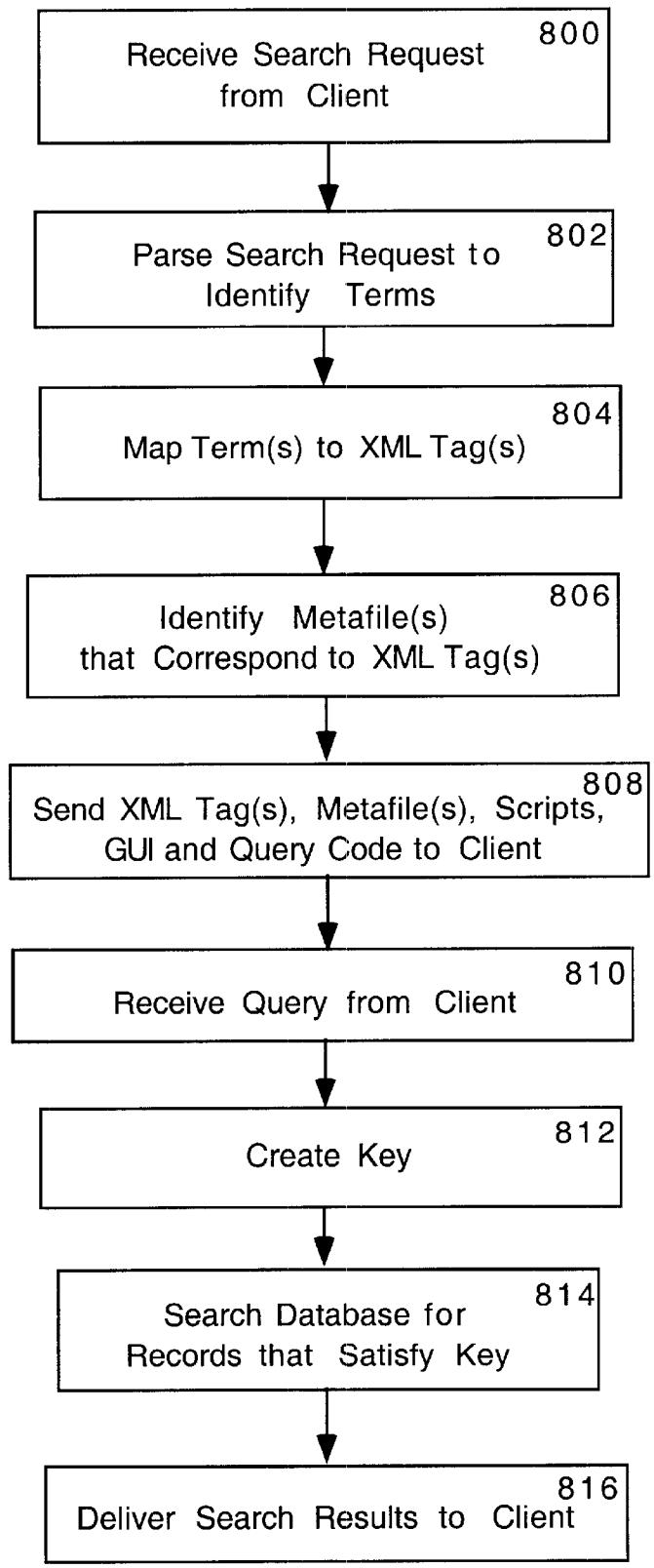
FIG. 8 is a flow diagram illustrating the steps performed by a server system to search a database, in accordance with an embodiment of the present invention.

FIG. 8 illustrates the steps performed by the server in a client-server environment. In step 800, the search request is received from the client. The search request is then parsed to identify the terms of the search request in step 802. The terms of the search request are then mapped to XML tags in step 804. Once the XML tags are identified in step 804, then the metafiles that correspond to the XML tags identified in step 804 are identified in step 806. The XML tags and the metafiles are then sent to the client. In addition, the server also sends query code to the client. The query code instructs the client to query the user to further refine the identified XML tags. Once the client has completed the query, the query results are received from the client in step 810. The query results include one or more XML tags. The XML tags are combined to create a key in step 812. The key is then used to search the database for records that include the XML tags in the key in step 814. Finally, the search results are delivered to the client in step 816.

Conclusion

In summary, the present invention is directed toward a method for locating information stored in a database using an index that includes tags and metafiles. Preferably, the index includes tags that correspond to categories and domains. An information request is parsed to identify the terms in the request. The terms are predetermined and generally correspond to the domains and categories of the index. The terms are mapped to tags. Once the appropriate tags are identified, then the metafiles that correspond to those tags are identified. The metafiles can be used to identify additional tags that are relevant to the search. The identified tags are combined to create a unique key. The key is used to search the database to locate records that include the tags in their index component. Once the records are located, the records are delivered to the requesting user or search agent. Although the present invention has been described in connection with the XML language, those skilled in the art will realize that the invention can also be practiced using other languages that use tags and support the association of a file, such as a metafile with a tag.

The present invention has been described in connection with information organized as a classified advertising or e-commerce directory. However, those skilled in the art will recognize that the invention is not limited to information organized as a classified advertising or e-commerce directory. For example, the invention can be used with information organized around a trade name or brand, or any other type of organization.

Alternative embodiments will be apparent to those skilled in the art to which the present invention pertains without departing from its spirit and scope. Accordingly, the scope of the present invention is described by the appended claims and is supported by the foregoing description.

What is claimed is:

1. A method for creating a database and an index to search the database, comprising the steps of:
   creating the index by defining a plurality of XML tags including domain tags and category tags;
   creating a first metafile that corresponds to a first domain tag; and
   creating the database by providing a plurality of records, each record having an XML index component.

2. The method of claim 1, wherein the step of creating the database by providing a plurality of records, comprises the step of:
   for each record, creating an alpha portion of the record that comprises identifying information for the record; and
   for each record, creating the XML index component by selecting from the defined XML tags a selected set of XML tags that are associated with the record.

3. The method of claim 1, wherein the step of creating a first metafile, comprises the steps of:
   selecting a first set of domain tags from the defined XML tags that are related to the first domain tag; and
   selecting a first set of category tags from the defined XML tags that are related to the first domain tag.

4. The method of claim 3, wherein the first domain tag is related to a first product and the first set of domain tags includes a selected domain tag that identifies a second product related to the first product so that the second product is marketed to a user when information related to the first product is provided to the user.

5. The method of claim 3, further comprising the step of:
   creating a hierarchy between the tags in the metafile.

6. The method of claim 1, wherein the step of creating a first metafile comprises the steps of:
   selecting a first set of XML tags from the defined XML tags that are related to the first domain tag; and
   creating a hierarchy between the tags in the first set of XML tags.

7. A method for searching a database of records using an index including a plurality of tags, comprising the steps of:
   receiving a request for information;
   identifying a first tag that is associated with the request;
   determining whether a first metafile comprising a second tag corresponds to the first tag;
   if the first metafile corresponds to the first tag, then determining whether the second tag is relevant to the request;
   if the second tag is relevant to the request, then combining the first tag and the second tag to create a key; and
   using the key to search the database to locate at least one record that includes the first tag and the second tag.

8. The method of claim 7, wherein the step of identifying a first tag that is associated with the request, comprises the steps of:
   parsing the request to identify a first term; and
   identifying the first tag that corresponds to the first term.

9. The method of claim 8, further comprising the steps of:
   identifying a third tag that corresponds to the first term;
   determining whether the first tag and the third tag indicate that the request is ambiguous;
   if the first tag and the third tag indicate that the request is ambiguous, then determining whether the first tag is related to the request; and
   if the first tag is related to the request, then using only the first tag to create the key.

10. The method of claim 9, further comprising the steps of:
    if the first tag and the third tag do not indicate that the request is ambiguous, then using the first tag and the third tag to create the key.

11. The method of claim 7, wherein the first metafile includes a fourth tag, further comprising the steps of:
    determining whether the second tag and the fourth tag indicate that the request is ambiguous;
    if the second tag and the fourth tag indicate that the request is ambiguous, then determining whether the second tag is related to the request; and
    if the second tag is related to the request, then using only the second tag to create the key.

12. The method of claim 7, wherein the plurality of tags include a plurality of category tags and a plurality of domain tags, each category tag associated with a term that provides information and each domain tag associated with a group of category tags.

13. The method of claim 12, wherein the category tags include a brand tag, a cuisine tag, a payment option tag, and an amenity tag.

14. A computer-readable medium having stored thereon computer-executable instructions for searching a database of records using an index including a plurality of tags, comprising the steps of:
    receiving a request for information;
    identifying a first tag that is associated with the request;

identifying a second tag that is associated with the request by determining that the second tag is included in a metafile associated with the first tag;

combining the first tag and the second tag to create a key; and using the key to search the database to locate records including the first tag and the second tag.

15. The computer-readable medium of claim 14, further comprising the steps of:

determining whether the first tag and the second tag indicate that the request is ambiguous;

if the first tag and the second tag indicate that the request is ambiguous, then conducting a query to determine whether the first tag or the second tag is relevant to the request;

if the determination is that the first tag is relevant to the request, then using the first tag, but not the second tag to create the key; and using the key to search the database to locate records including the first tag, but not the second tag.

16. The computer-readable medium of claim 14, wherein the request includes a first term, and wherein the step of identifying a first tag that is associated with the request, comprises:

identifying the first term in the request; and matching the first term to the first tag.

17. The computer-readable medium of claim 14, wherein the metafile includes a third tag, further comprising the steps of:

if the first tag and the second tag do not indicate that the request is ambiguous, then combining the first tag, the second tag, and the third tag to create a key; and using the key to search the database to locate records including the first tag, the second tag, and the third tag.

18. The computer-readable medium of claim 14, wherein the plurality of tags include a plurality of domain tags and a plurality of category tags, and wherein each domain tag identifies a group of selected category tags and each category tag identifies a group of terms providing business information.

19. A method for searching a database of information, comprising the steps of:

receiving a request for information from a client, the request having a first term;

identifying a first XML tag that is associated with the first term;

determining whether a first metafile corresponds to the first XML tag;

if the first metafile corresponds to the first XML tag, then transmitting the first XML tag, the first metafile and query code to the client;

once the client conducts a query by executing the query code using the first XML tag and the first metafile, then receiving query results including a first set of XML tags from the client;

combining the first set of XML tags into a key;

using the key to search the database to locate records including the first set of XML tags; and delivering the records including the first set of XML tags to the client.

20. The method of claim 19, wherein the first set of XML tags includes a domain tag and a category tag.

21. The method of claim 19, wherein each of the records includes an XML index component that includes at least one XML tag, and wherein the step of using the key to search the database to locate records including the first set of XML tags comprises:

searching the database to locate a record with an XML index component that include the first set of XML tags.

22. A method for identifying a record from a database of records that satisfies a request for information, comprising the steps of:

receiving the request for information;

sending the request to a server;

receiving a first XML tag and a first metafile that are associated with the request and query code from the server;

executing the query code to determine a first set of XML tags that are associated with the request;

sending the first set of XML tags to the server;

receiving the record from the server; and delivering the record.

23. The method of claim 22, wherein the first metafile includes a second XML tag, and wherein the step of executing the query code to determine a first set of XML tags that are associated with the request, comprises the steps of:

determining whether the second XML tag is associated with the request; and if the second XML tag is associated with the request, then including the second XML tag in the first set of XML tags.

24. The method of claim 22, wherein a third XML tag and a fourth XML tag are received from the server, and wherein the step of executing the query code to determine a first set of XML tags that are associated with the request, comprises the steps of:

if the third XML tag and the fourth XML tag indicate that the request is ambiguous, then determining whether the third XML tag is related to the request; and if the third XML tag is related to the request, then including the third XML tag, but not the fourth XML tag in the first set of XML tags.

25. A method for creating a metafile that can be used to locate records in a database that are related to a trade name, comprising the steps of:

selecting an XML tag that is associated with the trade name; and creating a metafile that is associated with the first domain tag by:

selecting a first XML tag that is associated with an authorized dealer of a product associated with the trade name;

selecting a second XML tag that is associated with an authorized service provider for the product;

selecting a third XML tag that is associated with an authorized parts provider for the product, so that the metafile can be used to locate records in the database that are related to the trade name.

26. The method of claim 25, further comprising the steps of:

in response to a request for information about authorized service providers of the product associated with the trade name, identifying the XML tag using the trade name;

identifying the metafile using the XML tag;

identifying the second XML tag using the metafile;

creating a key using the XML tag and the second XML tag;

using the key to search for records including the XML tag and the second XML tag.

27. A method for locating records related to a trade name, comprising the steps of:

receiving a request for information that includes the trade name;

identifying a first tag that is associated with the trade name;

identifying a metafile that is associated with the trade name;

determining whether the metafile identifies additional tags that are associated with the trade name;

if the metafile identifies additional tags that are associated with the trade name, then conducting a query to determine which of the additional tags are relevant to the request;

if the query determines that a second tag is relevant to the request, then combining the first tag and the second tag to create a key;

using the key to search a database to locate records that include the first tag and the second tag.

28. The method of claim 27, comprising the steps of:

if the query determines that none of the additional tags are relevant to the request, then using the first tag as the key; and using the key to search the database to locate records that include the first tag.

* * * * *

UNITED STATES PATENT AND TRADEMARK OFFICE
CERTIFICATE OF CORRECTION

| | | |
|---|---|---|
| PATENT NO. | : 6,510,434 B1 | Page 1 of 1 |
| APPLICATION NO. | : 09/474644 | |
| DATED | : January 21, 2003 | |
| INVENTOR(S) | : Charles D. Anderson et al. | |

It is certified that error appears in the above-identified patent and that said Letters Patent is hereby corrected as shown below:

In col. 1, line 18, replace "5,952,946" with --6,295,526--.

Signed and Sealed this
Sixth Day of November, 2012

David J. Kappos
*Director of the United States Patent and Trademark Office*